Figure 1:
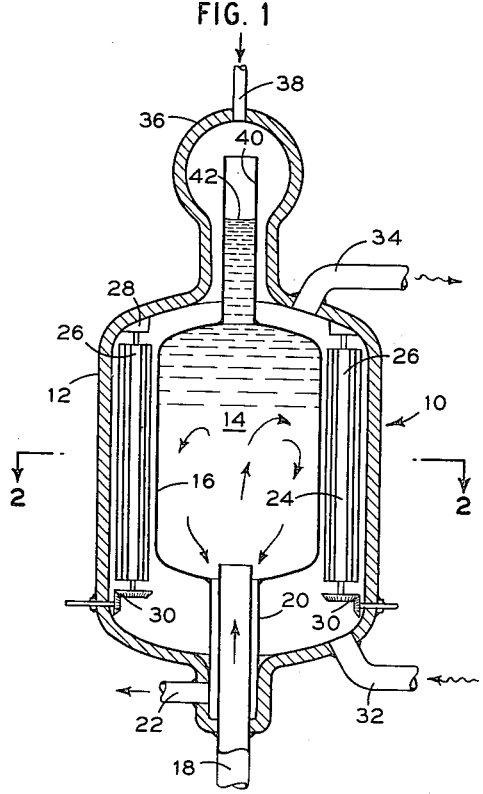

April 9, 1963

R. L. WHITELAW 3,085,056

METHOD AND APPARATUS FOR GENERATING AND SUPERHEATING
STEAM FROM NUCLEAR ENERGY

Filed Nov. 30, 1955

2 Sheets-Sheet 1

*INVENTOR.*
Robert L. Whitelaw

BY

*ATTORNEY*

INVENTOR.
Robert L. Whitelaw
BY
*J.P. Moran*
ATTORNEY 3,085,056
METHOD AND APPARATUS FOR GENERATING AND SUPERHEATING STEAM FROM NUCLEAR ENERGY
Robert L. Whitelaw, North Canton, Ohio, assignor to The Babcock & Wilcox Company, New York, N.Y., a corporation of New Jersey
Filed Nov. 30, 1955, Ser. No. 549,938
12 Claims. (Cl. 204—154.2)

This invention relates in general to a nuclear reactor and more specifically, it relates to an improved breeder-converter reactor in which the breeding blanket is cooled by superheated steam.

One of the best developed types of nuclear reactor is one in which the coolant is pressurized water, either light or heavy. This type of reactor has various forms, such as an aqueous homogeneous reactor in which the fuel is dissolved as uranyl sulphate in water; one using solid fuel elements which the water is pumped to cool them or in which the water boils; and another using fuel elements which are graphite moderated and water cooled. A common characteristic of these reactors is that the operating temperature of the water is limited to something less than the critical temperature of water because of the water's physical properties; therefore, when adapting these reactors to power generation all of the power cycles involve the use of low temperature saturated steam. Accordingly, the resultant power from the steam cycle is generated at a low thermal efficiency compared to fossil fuel-fired power generating equipment using superheated steam. This low efficiency is due primarily to the absence of high temperature superheated steam for use in the cycle.

It has been proposed that the reactor-furnished low temperature saturated steam be heated in a separate fossil fuel-fired superheater which would enable the use of a power generation cycle of high thermal efficiency. This proposal, although producing power at a lower cost, requires dual fuel services for the reactor and the superheater. This dual arrangement necessarily complicates the operation. Further, as atomic energy is to supplement fossil fuel as a primary source of power, it is considered to be an intermediary step in the eventual evolution of atomic energy as a primary heat source.

Accordingly, the present invention provides a method and apparatus of operating a thermal type nuclear reactor having a core chamber geometrically arranged to fission a homogeneous aqueous fissile fuel solution and structural fuel assemblies containing fertile material mounted to rotate about their major axes in a blanket chamber separate from and longitudinally surrounding the homogeneous core chamber. Means are provided for passing steam through the blanket chamber in heat transfer relationship with the fertile material elements, with the heat from the fertile elements supplying the superheat for the steam generated from the heat in the core chamber. The rotatably mounted fertile material assemblies are rotated so as to expose substantially all of their surface to the neutron flux of the core.

The various features of novelty which characterize the invention are pointed out with particularity in the claims annexed to and forming a part of this specification. However, for a better understanding of the invention, its operating advantages and specific objects attained by its use, reference should be had to the accompanying drawings and descriptive matter in which are illustrated and described preferred embodiments of the invention.

Figure 2:
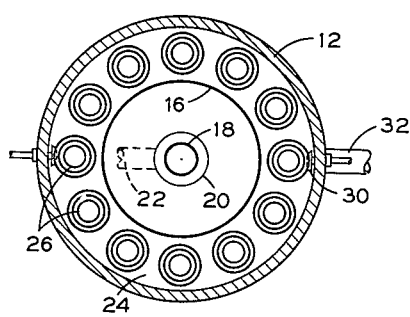

Of the drawings:
FIG. 1 is a vertical section through the reactor of the invention.
FIG. 2 is a plan section along the line 2—2 of FIG. 1.

Figure 3:
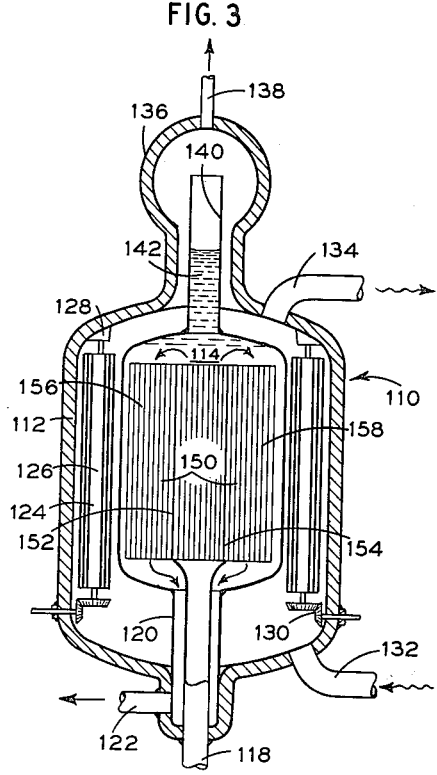
Figure 4:
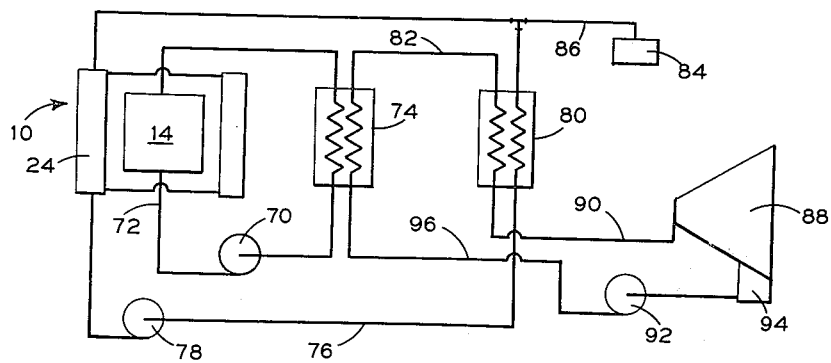

FIG. 3 is a vertical section through another embodiment of a reactor using the invention.
FIG. 4 is a diagram of a power cycle arrangement including the reactor of either FIG. 1 or FIG. 3.

In FIGS. 1 and 2 there is a themal type nuclear reactor 10 including a vertically elongated pressure vessel 12 having a core chamber 14 formed by the cylindrical baffle 16 within the vessel. The core chamber 14 is geometrically arranged so that an aqueous solution of uranyl sulphate will fission. A fuel solution enters the chamber by the inlet pipe 18 and after circulation during fission leaves by the outlet duct 20 and outlet pipe 22.

The baffle 16 in cooperation with the walls of pressure vessel 12 form an annular shaped blanket chamber 24 longitudinally surrounding the core chamber 14. Disposed in a ring within this chamber 24 there is a plurality of solid fertile material blanket assemblies 26. Each of these assemblies 26 may be, as shown, composed of a plurality of concentric and spaced cylindrical plates arranged to pass a cooling fluid therethrough and arranged to be mounted to rotate about its major axis. Upper bearings 28 and gear drive 30 are arranged to effect the rotation. An inlet pipe 32 is arranged to pass steam into the blanket chamber 24 whence it passes in heat transfer relationship with the element assemblies 26 and thence to and through an outlet pipe 34.

Disposed at the upper end of the pressure vessel there is a pressure vessel extension 36 into which is connected the line 38 from a system pressurizing device (not shown). Disposed within the extension 36 there is a core chamber extension 40 having a liquid level 42 in equilibrium and in communication with the vapor blanket chamber 24. The length of the pressure vessel extension 36 and the core chamber extension 40 is sufficient to assure the equilibrium without an excessive amount of vapor condensation caused by the flow of heat between the vapor and fuel solution.

The aqueous fuel solution in the core chamber 14 can be fissile fuel, such as slightly enriched natural uranium, $U_{233}$, and/or plutonium in various amounts disposed in either light or heavy water. The fertile material referred to in the assemblies 26 may be uranium 238 or thorium and may include small percentages of fissile materials. Each fertile material may be selected depending upon the neutron economy and conversion rate desired.

The reactor is arranged to provide a two region reactor in which the chain reaction heat is primarily produced in an aqueous homogeneous solution and is transported by the fuel solution itself while the heat released in the second chamber or blanket is released in the blanket assemblies 26 which are rotatably mounted so that substantially all of their surface may be exposed to the high neutron flux of the core, thus assuring that maximum conversion will take place during any loading period within the reactor.

The arrangement of the pressure vessel extension 36 and the core extension 40 provides an arrangement whereby the pressure may be equalized in the core chamber 14 and the blanket chamber 24 so that the baffle 16 defining the core chamber may be of minimum thickness to reduce the neutron capture. This pressure equalization is accomplished by allowing the water level surface 42 of the fuel solution to be maintained at the saturation temperature by condensing vapor within the pressure vessel extension. The length of the liquid column in the core chamber extension 40 allows a temperature gradient to exist down to the operating temperatures of the core which may be some 50–100° F. lower in temperature. The core chamber extension 40 is arranged with a minimum diameter to reduce the amount of the natural circulation of the fluid so as to inhibit large amounts of heat transfer.

FIG. 3 shows an alternate embodiment of the reactor of my invention in which many of the similar elements are numerically designated as in FIG. 1 except that some of them are designated by the same number with a prefix 1. The difference between FIG. 1 and FIG. 3 is that the core chamber 114 now contains a plurality of discrete structural fuel elements 150. The inlet pipe of the primary system 118 is arranged so that the fluid flows between two baffles 152 and 154 within the chamber 114 and then the fluid flows down the outside passes 156 and 158 to the outlet pipe 122. As in the reactor of FIG. 1 there is a core chamber extension 140 containing a liquid level 142 in communication with the vapor within the pressure vessel extension 136 which provides a balance of pressure within the pressure vessel 112.

In the arrangement of the reactor in FIG. 3 an aqueous coolant, such as light or heavy water, transports the heat released in the core chamber 114 while steam transports the heat released in the heterogeneous fertile elements 126 in the blanket chamber 124.

A power cycle in FIG. 4 shows either the reactor 10 or 110 having a core chamber 14 connected so that the primary fluid cooling the core is circulated by the pump 70 through the coolant loop 72 to a shell and tube type steam generator 74 where the heat from the primary fluid is indirectly transferred to boiling water. The blanket chamber 24 is connected by the inlet and outlet connections 32 and 34 into a closed steam circulating loop 76 wherein the steam is pumped by the pump 78 from the blanket chamber to a shell and tube type superheater 80 wherein the transported heat from the blanket chamber is transmitted to the generated steam flowing from the steam generator 74 and which is transported by the line 82 into the superheater 80.

A pressurizing device 84 constituting a vessel having a liquid level separating an upper steam space from a lower liquid space and heated by an electrical heater is arranged with its vapor space in communication via the line 86 with a pressurizer connection 38 in the pressure vessel extension 36 (FIG. 1). The line 86 has a small diameter so as to transmit pressure without a large amount of heat flow. A power turbine 88 receives the superheated steam from the superheater by the line 90. A condensate pump 92 takes the condensate out of the condensate 94 and pumps it via the feed water line 96 to the steam generator 74 to complete the power cycle arrangement.

The reactor 110 of FIG. 3 may be effectively used in the power cycle of FIG. 4 where the primary loop 72 holds either light or heavy water. The vapor which is circulated in the loop 76 will be a vapor corresponding to either the light or heavy water in the primary loop.

Although the reactors have been described to transmit the heat which generates and superheats steam by indirect means, each of the reactors would be capable of being arranged to have the steam generated indirectly in a separate heat exchanger and to superheat that steam directly by passing it in contact with fertile material elements in the blanket chamber of each of the reactors.

It is contemplated that the term "superheating" encompasses reheating of partially expanded steam for further use in the power cycle and that this reheated steam can be effectively heated by the present invention.

While in accordance with the provisions of the statutes I have illustrated and described herein specific forms of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

I claim:

1. In a nuclear reactor, a body of fissile material arranged in a core, a fertile material blanket directly encompassing a substantial portion of said core, means passing steam through said blanket in heat transfer relation therewith, and said blanket comprising a plurality of solid fertile material assemblies.

2. In a nuclear reactor, a body of fissile material arranged in a core, a moderator disposed throughout said fissile material, a fertile material blanket encompassing a substantial portion of said core, means passing steam through said blanket in heat transfer relation therewith, said blanket comprising a plurality of solid fertile material assemblies, and each of said assemblies being rotatably mounted to expose substantially all of its surface to the neutron flux of said core.

3. In a nuclear reactor, a body of fissile material arranged in a core, a fertile material blanket encompassing a substantial portion of said core, means passing steam through said blanket in heat transfer relation therewith, said blanket comprising a plurality of elongated fertile material assemblies, and each of said assemblies being rotatably mounted about its major axis in position to expose substantially all of its surface to the neutron flux of said core.

4. In a nuclear reactor, a body of fissile material arranged in a core, a moderator disposed throughout said fissile material, a fertile material blanket encompassing a substantial portion of said core, means passing steam through said blanket in heat transfer relation therewith, said blanket comprising a plurality of elongated fertile material assemblies, each of said assemblies being rotatably mounted about its major axis in position to expose substantially all of its surface to the neutron flux of said core, and means for rotating said assemblies.

5. A nuclear steam generator comprising a nuclear reactor including a core chamber geometrically arranged to fission a body of fissile material, walls forming an annular fertile material blanket chamber encompassing a substantial portion of said core chamber, a plurality of elongated fertile material assemblies mounted to rotate about their major axes in said blanket chamber, means for so rotating said fertile material assemblies, a shell and tube type vapor generator arranged at a position remote from said reactor, means circulating cooling water in a closed flow path through said reactor core and vapor generator, and means for the continuous transport of heat from the blanket to the generated vapor for the superheating thereof.

6. A nuclear steam generator comprising a nuclear reactor including a core chamber geometrically arranged to fission an aqueous fuel solution of fissile material, walls forming an annular fertile material blanket chamber directly encompassing a substantial portion of said core chamber, a plurality of solid fertile material assemblies mounted in said blanket chamber, and means circulating a body of steam through said blanket chamber to superheat the steam from the heat given up in the blanket assemblies.

7. A nuclear steam generator comprising a nuclear reactor including a core chamber geometrically arranged to fission a body of aqueous fuel solution of fissile material, walls forming an annular fertile material blanket chamber encompassing a substantial portion of said core chamber, a plurality of elongated solid fertile material assemblies mounted to rotate about their major axes in said blanket chamber, means for rotating said fertile material assemblies, and said core chamber arranged to provide a fuel solution liquid level in communication with the blanket chamber to balance pressure of the two chambers.

8. A nuclear steam generator comprising a nuclear reactor including a core chamber geometrically arranged to fission a body of aqueous fuel solution of fissile material, walls forming an annular fertile material blanket chamber encompassing a substantial portion of said core chamber, a plurality of elongated fertile material assemblies mounted to rotate about their major axes in said blanket chamber, means for so rotating said fertile material assemblies, a shell and tube type vapor generator arranged at a position remote from said reactor, means circulating the aqueous fuel solution in a closed flow path through said reactor core and vapor generator, a shell and tube type vapor superheater arranged remote from said reactor, means passing the generated vapor from said vapor generator through said vapor superheater, and means circulating a separate body of vapor in a closed flow path through said blanket chamber and said superheater for the continuous transport of heat from the blanket to the generated vapor for the superheating thereof.

9. A nuclear steam generator comprising a nuclear reactor including a core chamber geometrically arranged to fission a body of fissile material, walls forming an annular fertile material blanket chamber encompassing a substantial portion of said core chamber, a plurality of elongated fertile material assemblies mounted to rotate about their major axes in said blanket chamber, means for so rotating said fertile material assemblies, a shell and tube type vapor generator arranged at a position remote from said reactor, means circulating cooling water in a closed flow path through said reactor core and vapor generator, a shell and tube type vapor superheater arranged remote from said reactor, means passing the generated vapor from said vapor generator through said vapor superheater, and means circulating a separate body of vapor in a closed flow path through said blanket chamber and said superheater for the continuous transport of heat from the blanket to the generated vapor for the superheating thereof.

10. A nuclear steam generator comprising a nuclear reactor including a core chamber geometrically arranged to fission a body of fissile material, walls forming an annular fertile material blanket chamber encompassing a substantial portion of said core chamber, a plurality of elongated fertile material assemblies mounted to rotate about their major axes in said blanket chamber, means for so rotating said fertile material assemblies, a shell and tube type vapor generator arranged at a position remote from said reactor, means circulating cooling water in a closed flow path through said reactor core and vapor generator, a shell and tube type vapor superheater arranged remote from said reactor, means passing the generated vapor from said vapor generator through said vapor superheater, means circulating a separate body of vapor in a closed flow path through said blanket chamber and said superheater for the continuous transport of heat from the blanket to the generated vapor for the superheating thereof, said core chamber arranged to provide a liquid level in communication with the steam of the blanket chamber to balance the pressures in the two chambers, said liquid level positioned a distance from the main body of said fuel in said core chamber to minimize the transport of heat from the steam in the blanket chamber to said fuel solution.

11. A nuclear steam generator comprising a nuclear reactor including a core chamber geometrically arranged to fission a body of aqueous fuel solution of fissile material, walls forming an annular fertile material blanket chamber encompassing a major portion of said core chamber, a plurality of elongated fertile material assemblies mounted to rotate about their major axes in said blanket chamber, means for so rotating said fertile material assemblies, a shell and tube type vapor generator arranged at a position remote from said reactor, means circulating the aqueous fuel solution in a closed flow path through said reactor core and vapor generator, a shell and tube type vapor superheater arranged remote from said reactor, means passing the generated vapor from said vapor generator through said vapor superheater, means circulating a separate body of vapor in a closed flow path through said blanket chamber and said superheater for the continuous transport of heat from the blanket to the generated vapor for the superheating thereof, said core chamber arranged to provide a fuel solution liquid level in communication with the steam of the blanket chamber to balance the pressures in the two chambers, said liquid level positioned a distance from the main body of said fuel solution in said core chamber to minimize the transport of heat from the steam in the blanket chamber to said fuel solution.

12. A method of generating and superheating steam comprising burning nuclear fuel in a thermal type reaction zone and simultaneously emitting heat and free neutrons converting fertile material to fissile fuel by said neutrons from said reaction zone with the simultaneous release of heat, transporting heat by water from the fuel burning zone to a remote heat transfer zone to effect the generation of steam, transporting heat by steam from the conversion zone to a second remote heat transfer zone to effect the superheating of steam, and balancing the pressure of the first and second heat transport fluids.

References Cited in the file of this patent

UNITED STATES PATENTS

| 18,613 | Storm | Nov. 10, 1857 |
| 1,604,280 | Haag | Oct. 26, 1926 |
| 2,743,225 | Ohlinger | Apr. 24, 1956 |
| 2,787,593 | Metcalf | Apr. 2, 1957 |
| 2,806,820 | Wigner | Sept. 17, 1957 |
| 2,812,303 | Daniels | Nov. 5, 1957 |

FOREIGN PATENTS

| 1,108,289 | France | Aug. 24, 1955 |

OTHER REFERENCES

Proceedings of the International Conference on the Peaceful Uses of Atomic Energy, held in Geneva August 8–August 20, 1955, vol. 3 (Power Reactors), United Nations, New York, 1955, pages 250–272.